R. H. PERDUE AND L. W. THEIS.
DRAFTING APPLIANCE.
APPLICATION FILED OCT. 17, 1919.
1,351,534.
Patented Aug. 31, 1920.
3 SHEETS—SHEET 1.
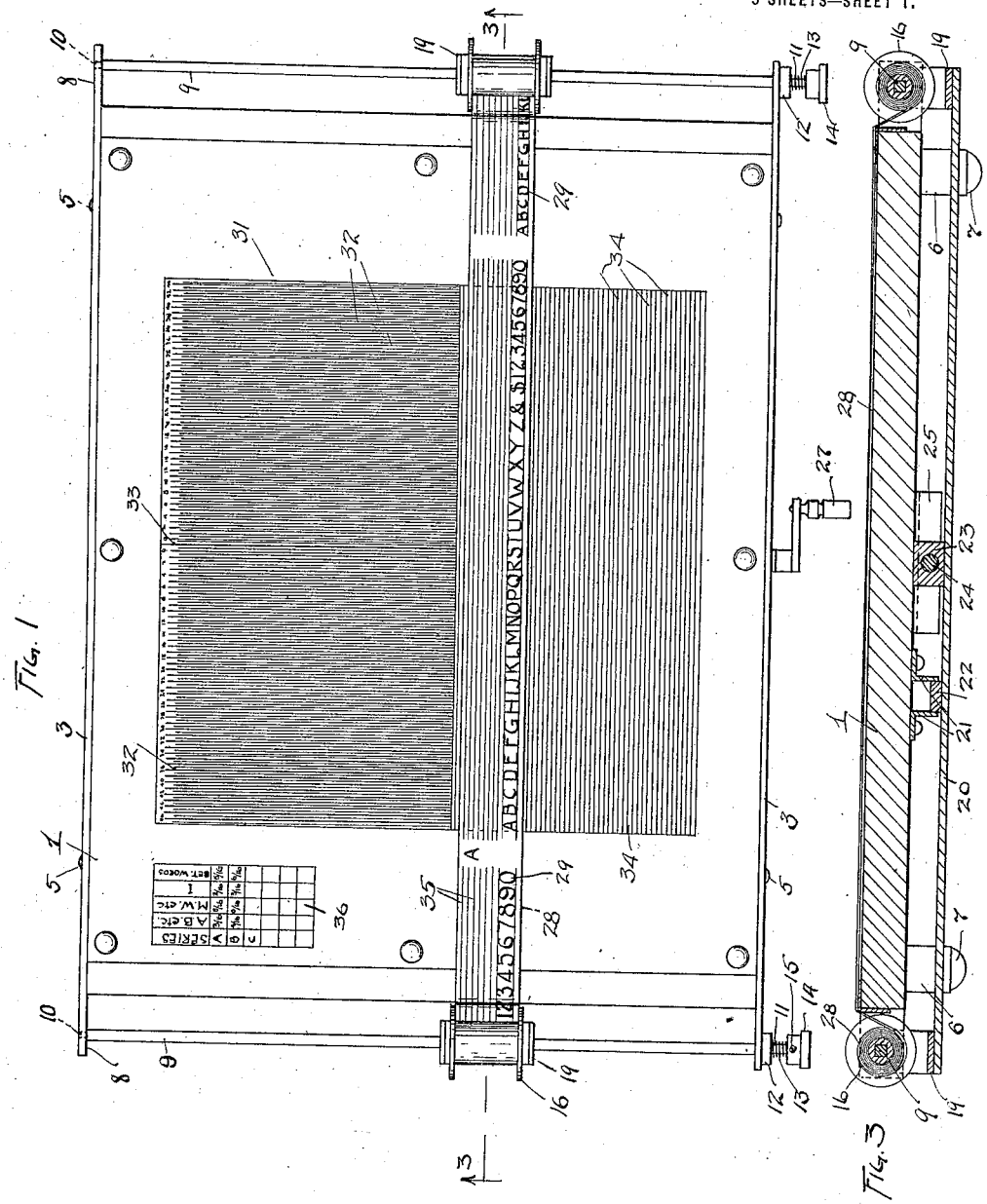
INVENTORS.
Robert H. Perdue and
LeRoy W. Theis.
By Fay, Oberlin & Fay
ATTORNEYS.

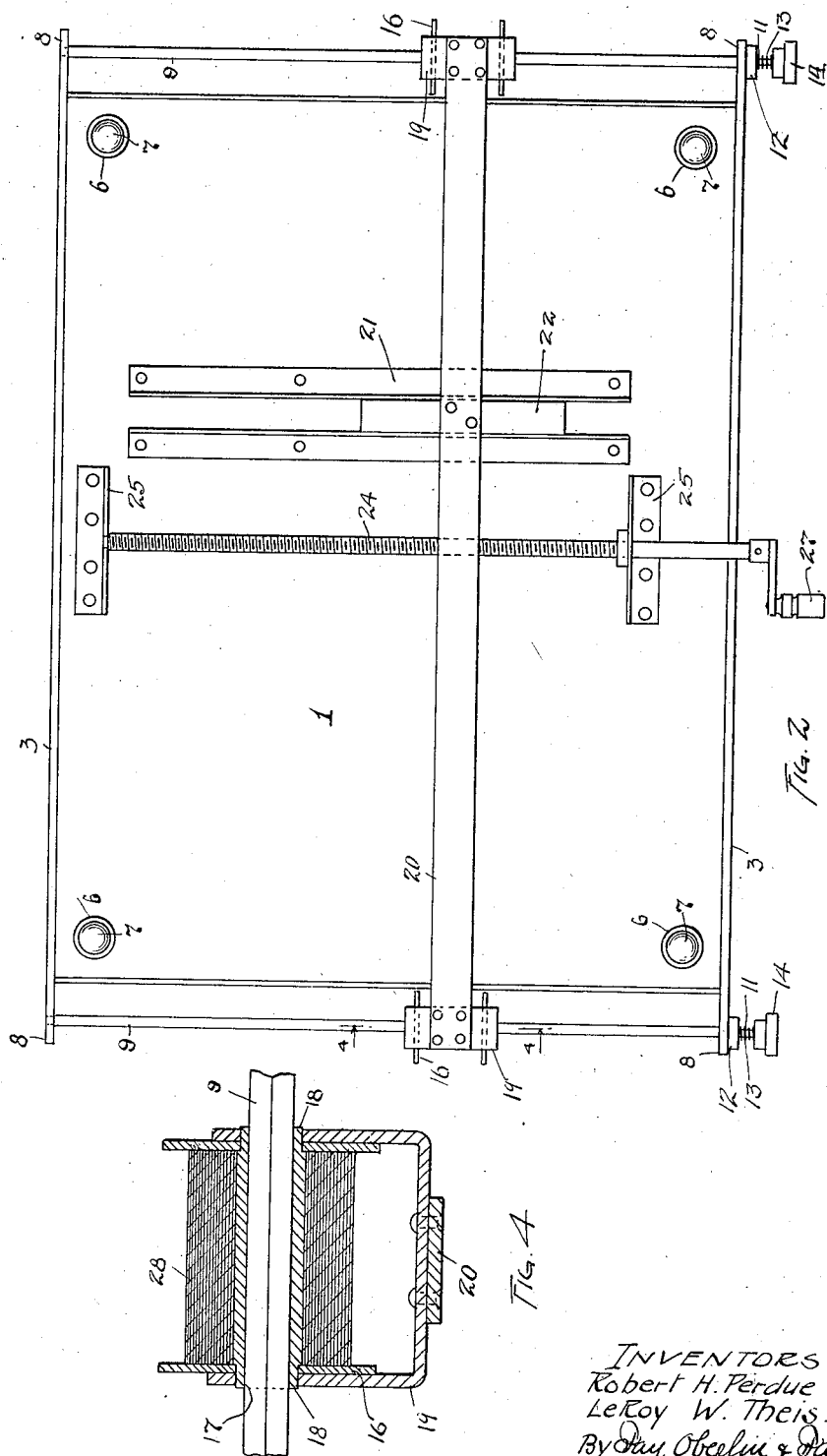

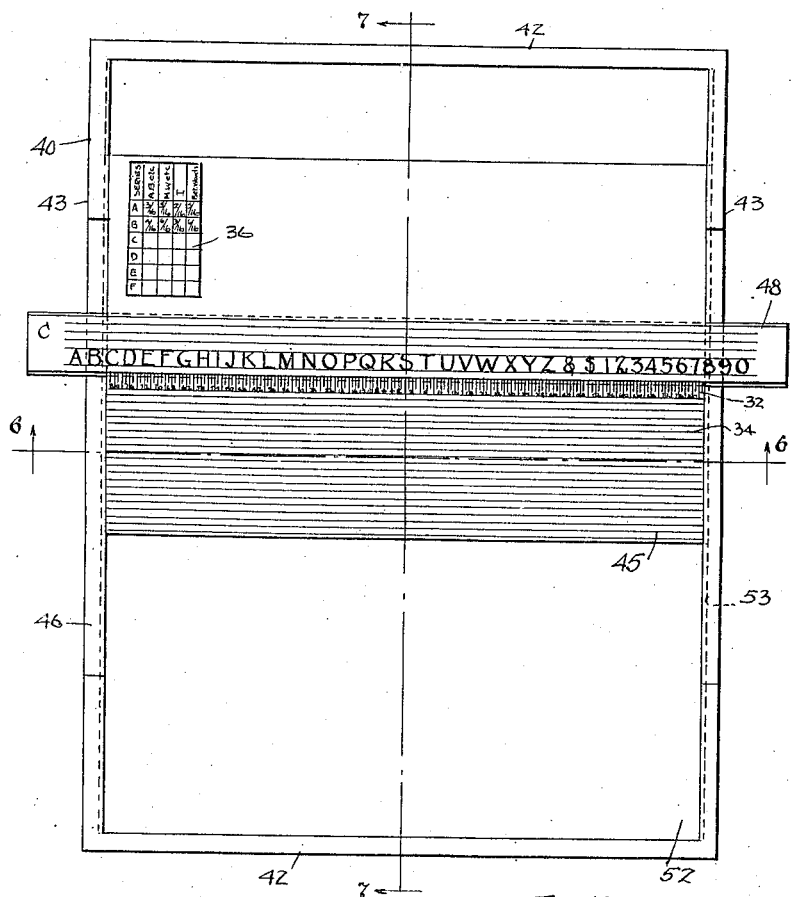
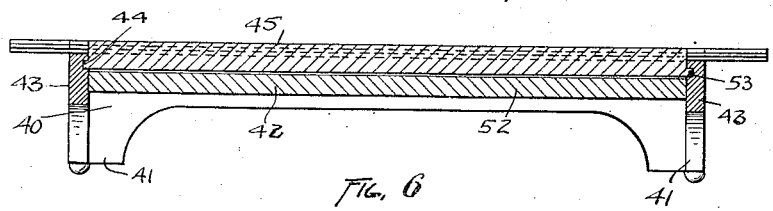
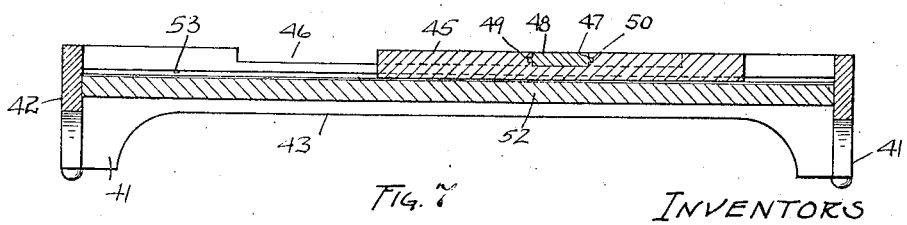

UNITED STATES PATENT OFFICE.

ROBERT H. PERDUE AND LEROY W. THEIS, OF CLEVELAND, OHIO.

DRAFTING APPLIANCE.

1,351,534. Specification of Letters Patent. Patented Aug. 31, 1920.

Application filed October 17, 1919. Serial No. 331,393.

*To all whom it may concern:*

Be it known that we, ROBERT H. PERDUE and LEROY W. THEIS, citizens of the United States, and residents of Cleveland, county of Cuyahoga, State of Ohio, have jointly invented a new and useful Improvement in Drafting Appliances, of which the following is a specification, the principle of the invention being herein explained and the best mode in which we have contemplated applying that principle, so as to distinguish it from other inventions.

The present invention relates to a drafting appliance suitable for use in lettering tracings and the like. Means are provided whereby the user can quickly space the desired characters correctly on the tracing and then copy or trace the characters rapidly. The device provides means whereby letters or characters of various types may be quickly brought into position for tracing and other means are provided so that the length of the title, other lettering or design may be quickly and accurately determined and the tracing arranged on the board so that the characters may be traced as desired. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a plan view of a drawing board embodying our invention; Fig. 2 is a bottom plan view of the board; Fig. 3 is a section on the line 3—3 of Fig. 1; Fig. 4 is a section on the line 4—4 of Fig. 2; Fig. 5 is a plan view of a modified form; and Figs. 6 and 7 are sections on the lines 6—6 and 7—7 respectively on Fig. 5.

As shown in the drawings, the present apparatus provides a board over which a tracing cloth or the like may be mounted, and the board is provided with various series of characters which may be moved both lengthwise or longitudinally and crosswise or transversely of the board, so as to bring them into the desired position under the tracing cloth so that they may be readily traced through. Other means are provided so that the correct position on the tracing cloth may be determined, and also so that the length of a line of characters may be computed.

As shown in Figs. 1 to 4, there is a suitable board 1 which is provided with a frame, having its top and bottom members 3 extending beyond the ends of the board. The frame is suitably attached to the board by screws 5 or the like. The present board is provided with legs 6 having rubber tips 7 to prevent it from sliding. The extending ends 8 of the frame are apertured, and squared shafts 9 are rotatably mounted in these apertures 10, one end 11 of each shaft extending through the frame member and being provided with a washer 12 next to the same which is held in frictional engagement against the frame by means of a coiled spring 13 surrounding the extending end of the shaft and held in place by means of a roller 14 which is mounted on the end of the shaft by a set screw 15 or the like.

On each of these shafts is mounted a spool 16 having a square aperture 17 to fit the shaft so that the spools are rotatable with the shafts but movable along the same. These spools have extending end portions 18 which are suitably engaged by cages 19 which extend below the bottom surface of the board and are connected together by a suitable bar or strap 20 which is riveted or otherwise rigidly secured to the bottom of the cages.

On the under side of the board is mounted a guideway 21 formed by two angle strips which run at right angles to the length of the board. Rigidly secured to the bar is a metal guide or block 22 which fits within the guide-way and holds the bar and the two cages in alinement on the shafts. To move the bar and thus the cages and spools along the shafts, the bar is provided with operating means, these means, as shown, consisting of a threaded block 23 attached to the bar, the block being engaged by a worm screw 24 carried in suitable bearings 25 mounted on the bottom of the board, the worm screw 24 having one end extending through the bearing and beyond the bottom edge of the board and provided with a handle 27 so that the screw may be turned to move the bar transversely of the board.

Wound upon the spools is a tape 28 provided with a plurality of series of characters 29, the characters of each series being shown as comprising the letters of the alphabet and numerals. These characters of each series are of the same height and are of such widths as is necessary for the different characters. Each of these series of characters is numbered as illustrated in Fig. 1 of the drawings, where series A is mounted centrally of the board. The characters can be moved both longitudinally of the board and transversely of the same, by either rotating the shafts or the worm screw, as may be desired. It is, of course, to be understood that the tape may be a suitable strip which may be rigid or semi-rigid, in which case it might either fit within the flanges of the spools or the spools might be dispensed with. The tape also has longitudinal spaces or lines 35 so that the successive lines may be spaced apart as desired. These spaces will preferably bear a direct relation to those on the form.

Mounted on the board within the frame is a form 31 which has spacings 32 and 34 arranged both transversely and longitudinally of the board. This form may be printed or formed directly upon the board or upon a sheet mounted upon the board as illustrated in the drawings. This form is mounted substantially centrally of the board and is provided with a center line 33, the spaces 32 to each side of the center line being numbered from the center. The spaces are all equal in width and the width of the spaces bears a direct relation to the width of the different series of characters.

In the form shown in Figs. 5, 6 and 7, we have provided a board 40 having legs 41, the board comprising frame members 42 and 43 in which a bottom plate 52 is mounted. The members 43 are provided with grooves 53 to receive the tongues 44 of a slidable panel 45 and the members 43 are cut down for a portion of their length as at 46. The panel is provided with a slot 47 in which is slidably mounted a bar 48 provided with tongues 49 mounted in grooves 50 in the sides of the slot. This bar may be rigid or it may be semi-flexible and will have a series of characters "C" thereon corresponding to a similar series on the tape of the other form. The panel below the bar is provided with the form 31 having the transverse spacings 32 and horizontal spacing 34 as in the previous form, these spaces 32 being numbered from the center line. As shown, the bars are made so that they may be turned over and will be formed with a series of characters on each side and a number of bars will be furnished to give the desired number and kinds of series of characters.

In the usual construction, the spaces will be one-sixteenth ($\frac{1}{16}$) of an inch in width, and the characters of each series will be various numbers of sixteenths of an inch. At one side of the board we provide a scale 36 giving the width of the various characters of each series as a certain number of spaces. In the characters of the alphabet, such characters as A, B, C, and the like, are, for example, three-sixteenths ($\frac{3}{16}$) of an inch in width, while the characters M and W would be five-sixteenths ($\frac{5}{16}$) of an inch, and the character I would be only two-sixteenths ($\frac{2}{16}$) of an inch.

As the width of each character can be readily obtained, the total length of any title may be readily computed, and the sheet to be lettered will be placed over the board and securely attached thereto with the center line of the box to contain the title spaced over the center line of the form. By then taking one-half of the total length of the title in number of spaces, the correct point to start the title may be readily found. To trace the title onto the sheet, it is then only necessary to move the tape or strip longitudinally or transversely until the correct letter is brought into position. The tape or strip is then moved longitudinally of the board to bring the necessary characters into position and the characters are traced through onto the sheet.

Where free hand lettering is desired, the box to contain the lettering is first centered correctly and then is brought down over the horizontal or longitudinal spacings in the form so that the heights of the letters may be readily determined, and as the lines between the spaces show through the sheet, it is not necessary for the draftsman to draw any lines upon the sheet, as he need only follow the lines in the form in placing his lettering. It will thus be seen that in lettering any tracing it is only necessary to decide upon the central transverse line of the lettering and then compute the lengths of each line of lettering after which the tracing may be placed on the drawing board and the lettering traced through from the characters on the movable character strip which comprises either the tape shown in Fig. 1 or the slidable bars shown in Fig. 5, by moving the strip to bring the desired characters into position under the sheet. As before stated, the tape will be provided with all the usual styles and sizes of lettering which will ordinarily be used, and in many instances, where a particular title, mark or design is often used, the title, mark or design will be formed on the tape, so that it may be traced off directly without moving the tape around. Where the bars are used there will be bars containing the necessary series of characters, marks, titles, etc., and the bars will be changed as necessary. By the present apparatus, the lettering of tracings or the like is facilitated and uniform lettering can be obtained, as the characters are traced and not drawn freehand. The lines are the correct distance apart as are the letters, it being understood that the width of a letter includes the necessary space between letters, while spaces between words will be allowed for in computing the length of each line. It is thus a simple matter to correctly space and letter a tracing in a minimum of time.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a drafting appliance, the combination of a board, provided with a form having both transverse and longitudinal spacings, a character strip mounted over said board, said strip and board being capable of both longitudinal and transverse relative movement, said strip having characters thereon, the size of said characters bearing a direct relation to said spacings.

2. In a drafting appliance, the combination of a board, provided with a form having both transverse and longitudinal spacings, said transverse spacings having a center line and the spaces being numbered in both directions therefrom, and a character strip provided with a series of characters, the characters of each series being formed of a size having a direct relation to said spacings, said strip and board being movable both transversely and longitudinally relatively of each other.

3. In a drafting appliance, the combination of a board, a form mounted on said board and provided with both transverse and longitudinal spacings, said transverse spacings having a center line and being numbered from said center line in both directions, and a character strip provided with series of characters, the characters of each series being formed to scale with each other, and each such series bearing a definite relation to said spacings, said strip being capable of both transverse and longitudinal movement over said board.

4. In a drafting appliance, the combination of a board, a form mounted on said board and provided with both transverse and longitudinal spacings, said transverse spacings having a center line and being numbered from said center line in both directions, a movable character strip provided with a plurality of series of characters, the characters of each series being formed to scale with each other, and each such series bearing a definite relation to said spacings, said strip being capable of both transverse and longitudinal movement over said board, and a scale mounted on said board at the side thereof and giving the relation between the characters of each series and said spacings.

5. In a drafting appliance, the combination of a drawing board having rotatable shafts, spools mounted on said shafts and capable of movement along the same, means connecting said spools, and other means for operating said connecting means to move said spools longitudinally on said shafts, and a tape adapted to be mounted on said spools.

6. In a drafting appliance, the combination of a drawing board having a rotatable shaft at each end, spools mounted on said shafts and capable of movement along the same, means connecting said spools and adapted to maintain the same in alinement on said shafts, and operating means for moving said spools along said shafts, and a tape adapted to be mounted on said spools across said board.

7. In a drafting appliance, the combination of a drawing board having a rotatable shaft at each end thereof, spools mounted on said shafts and adapted to be rotated thereby, said spools being capable of movement along said shafts, means connecting said spools and adapted to maintain them in alinement, operating means adapted to actuate said connecting means to move said spools along said shafts, handles on said shafts to rotate said spools, and a tape mounted on said spools and extending over said board.

8. In a drafting appliance, the combination of a drawing board having a rotatable shaft at each end thereof, spools mounted on said shafts and rotatable therewith, said spools being capable of movement along said shafts, cages engaging said spools, a bar extending below said board and connecting said cages to maintain said spools in alinement, and operating means connected to said bar for moving the same and said spools along said shafts, handles on said shafts for rotating the same and said spools, and a tape wound on said spools and adapted to be moved transversely of said board with said spools and longitudinally of said board by rotation of said spools.

9. In a drafting appliance, the combination of a drawing board having a rotatable shaft at each end thereof, spools mounted on said shafts and rotatable therewith, said spools being capable of movement along said shafts, cages engaging said spools, a bar extending below said board and connecting said cages to maintain said spools in alinement, and operating means connected to said bar for moving the same and said spools along said shafts, handles on said shafts for rotating the same and said spools, guide means mounted on the back of said board and connected to said bar to maintain said bar in a horizontal plane across the board during movement, and a tape wound on said spools and adapted to be moved transversely of said board with said spools and longitudinally of said board by rotation of said spools.

Signed by us this 13th day of October, 1919.

ROBERT H. PERDUE.
LEROY W. THEIS.